(No Model.)
E. H. & J. H. KLEMROTH.
NUT LOCK.
No. 307,722. Patented Nov. 4, 1884.
Fig. 1.
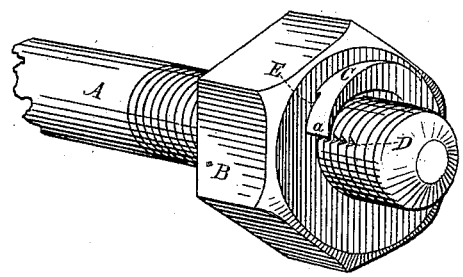
Fig. 2.  Fig. 3.  Fig. 4.
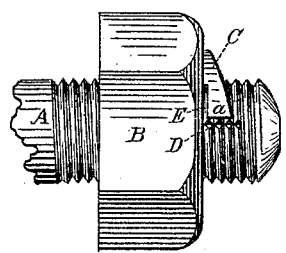 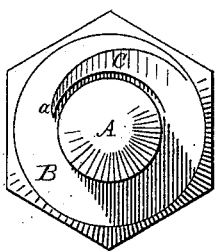 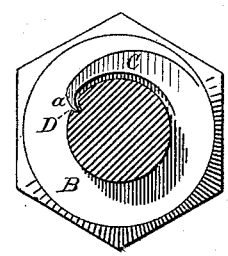
Witnesses:
Jno Cameron
J. Egbert Horford
Inventors:
Edgar H. Klemroth
John H. Klemroth

UNITED STATES PATENT OFFICE.

EDGAR H. KLEMROTH AND JOHN H. KLEMROTH, OF PHILADELPHIA, PA.

NUT-LOCK.

SPECIFICATION forming part of Letters Patent No. 307,722, dated November 4, 1884.

Application filed March 13, 1884. (No model.)

*To all whom it may concern:*

Be it known that we, EDGAR H. KLEMROTH and JOHN H. KLEMROTH, citizens of the United States, residents of Philadelphia, county of Philadelphia, State of Pennsylvania, and temporarily residing in the city of Washington, District of Columbia, have invented a new and useful Nut-Lock, of which the following is a specification.

Our invention relates to nut-locks, and its object is to lock a nut on a bolt so that it cannot, unaided, become loosened or come off. We attain this object in a manner shown by the accompanying drawings, in which—

Figure 1 is a perspective view of the nut and lock on the screw-bolt. Fig. 2 is a side view showing the locking projection free from the groove. Fig. 3 is a front view with the nut unlocked. Fig. 4 is a front view with a section of the bolt shown so as to display the groove with the locking projection or prong fastened into it.

Similar letters refer to similar parts.

The letter A in the drawings represents the screw-bolt. B is the nut screwed on the bolt A, threaded in the usual manner. Upon the outer face of said nut is rigidly secured the locking projection or prong C. This projection or prong C is semicircular in form, and gradually rises from the face of the nut, at the same time decreasing in width until it terminates with a beveled edge at $a$, as shown, for the purpose hereinafter described. A slit, as at E, is cut between the face of the nut and the end $a$ of said projection or prong C. This is for the purpose of freeing the end of the locking projection, so that it can be bent into the groove D. The groove D may be of any length desired, and may be grooved in the manufacture of the bolt, or may be cut by a cold-chisel or other tool when it is desired to lock the nut—that is to say, before screwing on the nut or after screwing it on, and before bending in the portion $a$ of the projection C. When the nut has been screwed on the bolt to its desired position, the end $a$ of the locking projection or prong C can be punched or driven into the groove, thereby firmly and effectually locking the nut on the bolt.

We, by the above-described device and means, produce an article which is at once simple in construction and easily fastened by any ordinary workman or laborer. If it is desired to release the nut, it is only necessary to pry the end $a$ out of the slot, so that it will clear the threads of the bolt, or by a heavy forward pressure on the nut by means of a wrench the nut might be moved far enough on the bolt to force the end $a$ out of the groove, and, as the nut is made of malleable metal, it will maintain its latter position, so as to allow the nut to be unscrewed. It is of course understood that the nut, with its integral projection, can be made by striking it up in dies, or by other well-known means of construction.

This device may be used on any form or size of nut.

Having described our invention, what we claim and desire to secure by Letters Patent, is—

1. A nut provided with an integral projection having a free flexible portion pointing in the direction in which the nut moves when unscrewing, and capable of being bent horizontally inward to engage its end with the bolt, substantially as shown and described.

2. The combination of a nut provided with an integral projection having a free flexible portion pointing in the direction in which the nut moves when unscrewing, with a grooved bolt, the flexible portion being bent inwardly, with its end engaging the groove of the bolt, substantially as shown and described.

3. The combination, with the nut B, prong C. having beveled end $a$, and slit E, of the bolt A, having groove D, substantially as described, and shown in the drawings.

EDGAR H. KLEMROTH.
JOHN H. KLEMROTH.

Witnesses:
JNO. CAMERON,
J. EGBERT HOSFORD.